United States Patent [19]

Omae

[11] 4,359,362
[45] Nov. 16, 1982

[54] METHOD AND APPARATUS FOR PREVENTING GENERATION OF SMOKE FROM COKE OVENS

[75] Inventor: Yoshihiro Omae, Kitakyushu, Japan

[73] Assignee: Mitsubishi Kasei Kogyo Kabushiki Kaisha, Tokyo, Japan

[21] Appl. No.: 227,495

[22] Filed: Jan. 22, 1981

[30] Foreign Application Priority Data

Jan. 28, 1980 [JP] Japan .................................. 55-8477

[51] Int. Cl.³ .............................................. C10B 5/00
[52] U.S. Cl. ....................................... 201/1; 202/141; 202/256; 202/258
[58] Field of Search ............... 202/263, 256, 255, 254, 202/258, 141; 201/1

[56] References Cited

U.S. PATENT DOCUMENTS

1,873,078  8/1932  Van Ackeren ...................... 202/255
4,105,503  8/1978  Bruce ................................. 202/255

Primary Examiner—Norman Yudkoff
Attorney, Agent, or Firm—Oblon, Fisher, Spivak, McClelland & Maier

[57] ABSTRACT

A method and apparatus of preventing generation of smoke from a coke oven including a plurality of juxtaposed and alternately disposed combustion chambers and carbonization chambers so that the carbonization chambers are heated by heat generated in adjacent combustion chambers and exhaust gas is exhausted from the combustion chambers through a common smoke duct and a chimney, the exhaust gas is passed through a common exhaust gas duct including a dust collector for a predetermined interval after loading raw material coal into the carbonization chambers. At the end of this interval, the exhaust gas is again passed through the common smoke duct.

9 Claims, 2 Drawing Figures

METHOD AND APPARATUS FOR PREVENTING GENERATION OF SMOKE FROM COKE OVENS

BACKGROUND OF THE INVENTION

1. Field of the Invention

This invention relates to a method and apparatus for preventing generation of black smoke from a coke oven through a chimney after loading raw material coal.

2. Description of the Prior Art

Usually, a coke oven includes a plurality of juxtaposed and alternately disposed combustion chambers and carburization (i.e. meaning introducing carbon into a solid ferrous alloy by heating) chambers so that the latter chambers are heated by the heat generated in adjacent combustion chambers and transmitted through walls partitioning adjacent combustion and carbonization chambers. The exhaust gases from respective combustion chambers are exhausted from the chimney via sole flue exit ports, hot exhaust valves of respective combustion chambers and a common smoke duct.

In a coke oven provided with a heat storage chamber, the hot exhaust valves are switched at a predetermined interval. Odd numbered hot waste valves and even numbered hot waste valves are alternately switched by a longitudinally reciprocating steel operating strip or bar horizontally disposed above the hot exhaust valves.

When cracks are formed through the partition walls after use of long time smoke would efflue from the chimney. More particularly, during an interval of about 15-20 minutes subsequent to the charging of the raw material coal, a large quantity of gas evolves and the gas leaks into the combustion chambers from the carbonization chambers thus resulting in incomplete combustion which forms smokes. Since such smoke causes a public hazard and impairs environmental sanitation it is desirable to reduce as far as possible generation of such smoke.

As a method of preventing the generation of black smoke it is usual to install an electric precipitator in the common smoke duct leading to the chimney. According to this method, however, the whole quantity of the exhaust gas generated by the entire coke oven installation is treated so that a large precipitator is necessary because the quantity of the exhaust gas is large, 1000 to 2000 Nm$^3$/min. for example, and because the concentration of the smoke is low which increases the cost of installation and operation.

SUMMARY OF THE INVENTION

It is an object of this invention to provide a novel method and apparatus capable of preventing generation of harmful smoke from a coke over with a simplified construction.

Another object of this invention is to provide an improved method and apparatus for removing harmful smoke and dust exhausted from a coke oven installation with high efficiency.

According to one aspect of this invention there is provided a method of preventing generation of smoke from a coke oven of the type including a plurality of juxtaposed and alternately disposed combustion chambers and carbonization chambers so that heat generated in the combustion chambers is transmitted to adjacent carbonization chambers through partition walls therebetween, each of the combustion chambers being provided with a sole flue exit opening and a mechanism for exhausting exhaust gas from respective combustion chambers through a chimney via the sole flue exit openings, hot exhaust valves connected thereto and a common smoke duct, characterized in that the method includes the steps of preparing a common smoke conduit and a dust collector contained therein, one end of the common smoke conduit being connected with the chimney, shut off valves connected between the other end of the common smoke conduit and the hot exhaust valves of respective combustion chambers, driving out the exhaust gas from the combustion chambers on the opposite sides of one carbonization chamber into which raw material coal has just been loaded, through the sole flue exit ports and the hot exhaust valves associated with the combustion chambers, shutting off a path of the exhaust gas flow from the hot exhaust valves to the common smoke duct and, passing the exhaust gas through the common smoke conduit and the dust collector.

According to another aspect of this invention there is provided an apparatus for preventing generation of smoke from a coke oven of the type including a plurality of juxtaposed and alternately disposed combustion chambers and carbonization chambers so that heat generated in the combustion chambers is transmitted to adjacent carbonization chambers through partition walls therebetween, each of the combustion chambers being provided with a sole flue exit opening, and a mechanism for exhausting exhaust gas from respective combustion chambers through a chimney via the sole flue exit openings, hot exhaust valves connected thereto and a common smoke duct, characterized in that the apparatus includes a common smoke conduit and a dust collector contained therein, one end of the common smoke conduit being connected with the chimney, shut off valves connected between the other end of the common smoke conduit and the hot exhaust valves of respective combustion chambers, and a control mechanism for controlling the shut off valves and the hot exhaust valves such that exhaust gas evolved in the combustion chambers on both sides of a carbonization chamber which has just been loaded with raw material coal is conveyed to the chimney via the common smoke conduit via the shut off valves for a predetermined interval after loading the raw material coal.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
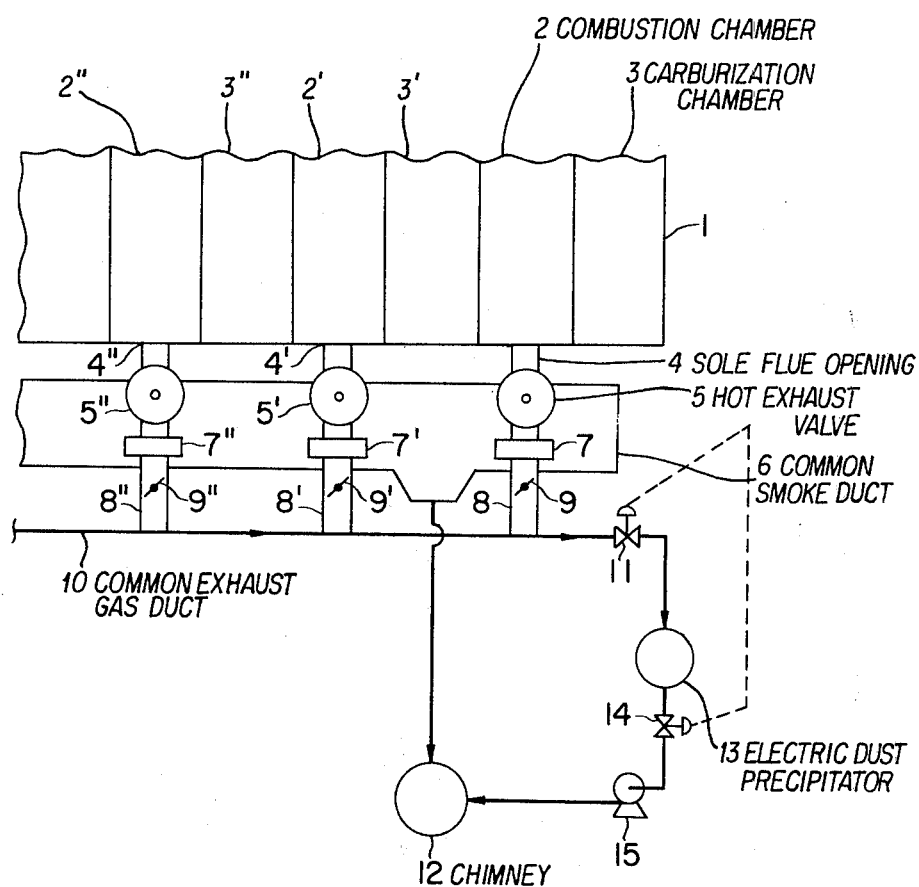
FIG. 1 is a plan view diagrammatically illustrating a portion of a coke oven embodying the invention for preventing generation of black smoke.

A coke oven 1 is made up of a plurality of juxtaposed and alternately disposed carbonization chambers 3, 3', 3", . . . and combustion chambers 2, 2', 2", . . . , which are partitioned by partition walls, and the number of these chambers usually amounts to 50 to 100 in one coke oven. The sole flue exit openings 4, 4',4", . . . of respective combustion chambers 2, 2', 2", . . . are provided with hot exhaust valves 5, 5',5", . . . respectively. Taking the carbonization chamber 3' as an example, the lower opening 21' of the hot exhaust valve 5' is connected to a common smoke duct 6 extending in the longitudinal direction of the coke oven 1 by a shut off valve 22' and the common smoke duct 6 is communicated with a chimney 12. The side opening 20' of the hot waste valve 5' is connected with a common exhaust gas duct 10 extending along the coke oven 1 via a shut off valve 7', and an exhaust gas duct 8'. It should be understood that the other hot exhaust valves 5', 5" and elements associated therewith are constructed and arranged in the same manner. The common exhaust gas duct 10 is connected to the chimney 12 via a dust collector such as a back filler, and an electric precipitator 13, a valve 14 and an exhaust fan 15.

Figure 2:
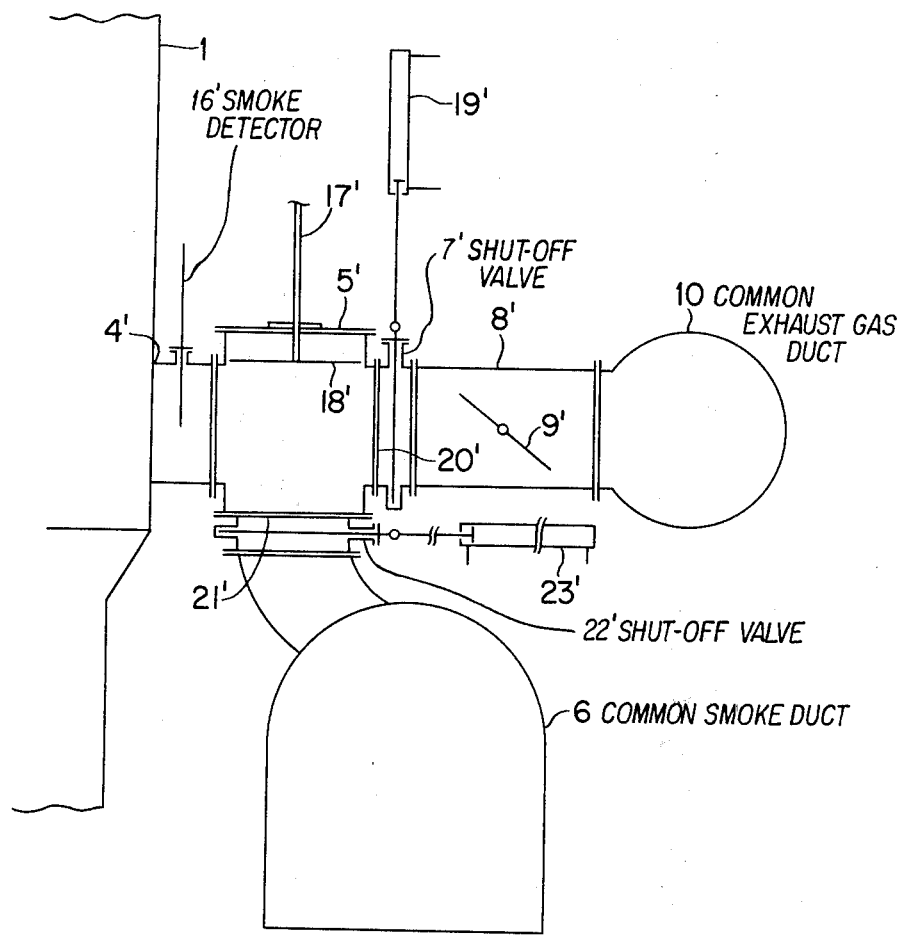
FIG. 2 is a diagrammatic sectional view showing a portion of the coke oven installation.

The operation of the coke oven described above will now be described taking the carbonization chamber 3' as an example. In this case, it is assumed that the exhaust gases of the combustion chambers 2' and 2" on the opposite sides of the carbonization chamber 3' are discharged through the hot exhaust valve 5'. Then this valve 5' is raised to a position shown in FIG. 2 by the longitudinal movement of the operating rod (not shown) so that there is a tendency for the valve 5' be drawn by suction toward the smoke conduit 6 by the flow of the exhaust gas passing through the lower opening 21'. Actually, discharge of the exhaust gases of the combustion chambers 2' and 2" is switched to pass alternately through hot exhaust valve 5' and hot exhaust valves 5 and 5". Under these conditions when a charging signal is applied to a coal charging car (not shown) running above the coke oven 1 charging of the raw material coal into the carbonization chamber 3' is started, while at the same time, the open and closed states of the hot exhaust valves 5, 5', 5" and a corresponding valve member 18' (only 18' is shown) communicating with the combustion chambers 2 and 2" are confirmed by an electric signal produced by the charging car. Such confirmation can be made depending upon whether valve stem 17' (only 17' is shown) corresponding to each exhaust valve is raised or lowered, whether the number of the signals produced by a master clock (not shown) for switching the operations of corresponding winches (not shown) operated by the operating rod is an odd or even number, or whether the switching valve for switching the coke oven gas utilized for combustion is open or closed. When it is confirmed that the hot exhaust valve 5' is open and that the hot exhaust valves 5 and 5" are closed, a fluid piston cylinder assembly 19' of the shut off valve 7', and a fluid piston cylinder assembly 23' for operating the shut off valve 22' juxtaposed to the hot exhaust valve 5' are actuated so as to close the shut off valve 22' for disconnecting the hot exhaust valve 5' from the common smoke conduit 6. The exhaust gases containing smoke and exhausted from the combustion chambers 2' and 2" are discharged or sucked into the common smoke duct 10 from the sole flue exit opening 4' via the hot exhaust valve 5' and the exhaust duct 8', and then discharged into the chimney via precipitator 13 and exhaust fan 15. Thus, the gas exhausted from the chimney 12 is free from smoke and dust, thereby alleviating the problem of constituting a public hazard.

The pressure in the exhaust collecting duct 10 is maintained at a reduced pressure of about 10 mm $H_2O$ by pressure control valves 11 and 14. The pressure in the exhaust gas duct 8' is maintained at a pressure substantially the same or slightly lower than that at the sole flue exit opening 4' by adjusting a damper 9' contained in the duct 8'.

As above described, when a predetermined time of about 15-20 minutes has elapsed after charging the raw material coal or when back smoke is not detected by a smoke detector 16' installed on the inlet side of the valve 5', the fluid pressure piston-cylinder assemblies 19' and 23' are actuated to close the shut off valve 7' and open the shut off valve 22'. The exhaust gas not containing smoke enters into the smoke duct 6 via opening 21' beneath the hot exhaust valve 5' and is then discharged into the atmosphere through the chimney 12.

As above described, although the flow path of the exhaust gas is changed by switching the hot exhaust valves at a predetermined interval, the hot exhaust valves are often switched during the smoke removing treatment. In such a case, the degree of opening of hot exhaust valves 5 and 5" and the degree of closure of the hot exhaust vlve 5' are detected by the movements of the valve stems of the hot exhaust valves 5, 5' and 5". An electric signal is produced by the operating rod for switching the operation of winches for operating the hot exhaust valve or by the movement of the switching valve for the coke oven gas utilized for combustion, and according to the result of the detection, the corresponding fluid pressure piston-cylinder assemblies and 23' (only 19' and 23' are shown) are actuated, so that shut off valves 7', 7" and 22' are opened, while shut off valves 7', 22 and 22" are closed. Consequently, the exhaust gases containing smoke and generated in the combustion chambers 2' and 2" are discharged into the exhaust gas collecting duct 10 from side openings 20 and 20" of the hot exhaust valves 5 and 5" through exhaust gas ducts 8 and 8" and then removed with smoke by the dust remover 13 in the same manner as above described. Consequently, even when the hot exhaust valves are switched during the smoke removal treatment, this treatment would not be interrupted.

Although in the foregoing description, various operations were described to be made automatically it is also possible to manually open and close shut off valves while observing the degree of opening and closing of the hot exhaust valves.

Furthermore, instead of intercepting the communication between the lower opening of a hot exhaust valve (for example 5') and the smoke conduit 6 with a shut off valve 22', the valve member 18' can directly close the lower opening. To this end, the valve stem 17' may be operated by a fluid pressure piston-cylinder assembly, or a cam or cable, etc. operated by an operating member longitudinally extending above the coke oven.

Above described smoke removing treatment is executed successively at each time when the raw material coal is loaded in respective carburization chambers. When the interval of raw material loading operations is substantially equal to the time necessary for removing smoke the exhaust gas of a combustion chamber now to be loaded with the raw material coal is admitted into the exhaust gas collecting duct by controlling various valves with an electric signal from a raw material loading car while at the same time the fluid pressure piston-cylinder assemblies are actuated to admit the combustion exhaust gas into the smoke duct 6 from a combustion chamber which was loaded with coal at a preceding time.

As above described, since according to this invention, the exhaust gases are derived from and subjected to the dust removing treatment from only the combustion chambers on both sides of a carbonization chamber loaded with raw material coal for only a short time subsequent to the coal loading, the concentration of the smoke in the exhaust gas to be treated is low and the quantity of the gas to be treated is small thus not only improving the efficiency of smoke removal but also decreasing the cost of installation and running.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the united states is:

1. A method of preventing generation of smoke from a coke oven into which raw material coal is to be loaded of the type including a plurality of juxtaposed and alternately disposed combustion chambers and carbonization chambers so that heat generated in the combustion chamber is transmitted to adjacent carbonization chambers through partition walls therebetween, each of the combustion chambers being provided with a flue exit opening and means for exhausting exhaust gas from respective combustion chambers through a chimney via each of said flue exit openings, hot exhaust valve means connected to said flue exit openings, a common exhaust gas duct connected to said chimney, a dust collector disposed in said exhaust gas duct, and a common smoke duct connected to said chimney, shut off valve means connected between one end of said common exhaust gas duct and the hot exhaust valve means of respective combustion chambers, which comprises:

driving out the exhaust gas from the combustion chambers on opposite sides of one of said carbonization chambers into which the raw material coal has been loaded through the flue exit openings, said hot exhaust valve means associated with said one combustion chamber and said common smoke duct to said chimney so as to bypass said exhaust gas duct and said dust collector;

shutting off a path of the exhaust gas flow from said hot exhaust valve means to said common smoke duct; and passing said exhaust gas through said common exhaust gas duct and said dust collector to said chimney so as to bypass said common smoke duct.

2. The method according to claim 1, which further comprises:

passing said exhaust gas through said common exhaust gas duct and said dust collector for a predetermined interval after loading the raw material coal into said one carbonization chamber; and subsequently passing said exhaust gas into said common smoke duct from said hot exhaust valve means at the end of said predetermined interval.

3. An apparatus for preventing generation of smoke from a coke oven comprising:

a plurality of juxtaposed and alternately disposed combustion chambers and carbonization chambers having partition walls formed therebetween such that raw material coal can be loaded into said carbonization chambers such that heat generated in the combustion chamber is transmitted to adjacent carbonization chambers through said partition walls, each of said combustion chambers having a flue exit opening formed therein;

a chimney;

a common smoke duct connected to said chimney;

a dust collector in communication with said chimney;

means for exhausting exhaust gas from respective combustion chambers through said chimney via said flue exit openings;

hot exhaust valve means connected to each of said flue exit openings and said common smoke duct; the common smoke duct being connected to the chimney in bypass to the dust collector;

a common exhaust gas duct wherein said dust collector is in communication with said common exhaust gas duct, a first end of said common exhaust gas duct being connected with said chimney;

shut off valve means connected between a second end of said common exhaust gas duct and the hot exhaust valve means of respective combustion chambers; and control means for controlling said shut off valve means and said hot exhaust valve means such that the exhaust gas evolved from said combustion chambers on opposite sides of an adjacent carbonization chamber loaded with the raw material coal is conveyed to said chimney via said common exhaust gas duct via said shut off valve means for a predetermined interval after loading of said raw material coal into said carbonization chamber so as to bypass said common smoke duct and to pass the exhaust gas through the dust collector.

4. The apparatus according to claim 3, further comprising secondary shut off valve means respectively disposed between said common smoke duct and said hot exhaust valve means.

5. The apparatus according to claim 4 wherein said hot exhaust valve means further comprises secondary shut off valve means disposed at an inlet portion of said common smoke gas duct.

6. The apparatus according to claim 3, further comprising a smoke detector installed between the flue exit opening and the hot exhaust valve means of each combustion chamber for controlling operation of said control means.

7. The apparatus according to claim 3, wherein said means for exhausting exhaust gas further comprises a secondary exhaust gas duct interconnecting said shut off valve means and said common exhaust gas duct and means disposed in said secondary exhaust gas duct between said shut off valve means and said common exhaust gas duct for maintaining pressure in said secondary exhaust gas duct at a pressure substantially equal to or slightly lower than a pressure at the sole flue exit openings.

8. The apparatus according to claim 3, wherein said duct collector further comprises an exhaust fan interconnecting said common exhaust gas duct and said chimney.

9. The apparatus according to claim 3, further comprising pressure control valve means interconnecting said common exhaust gas duct and said chimney.

* * * * *